3,823,220
SEPARATION OF RHODIUM FROM IRIDIUM
Lorraine Guy Donaruma, Potsdam, and Lauri Vaska, Norwood, N.Y., assignors to The International Nickel Company, Inc., New York, N.Y.
No Drawing. Filed Sept. 11, 1972, Ser. No. 288,051
Int. Cl. C01g 55/00
U.S. Cl. 423—22                          6 Claims

ABSTRACT OF THE DISCLOSURE

A method for separating rhodium from iridium by the selective volatilization of a rhodium halide-carbon monoxide product through special control of reaction temperature. Formation of the rhodium halide-carbon monoxide product is favored by employing a water vapor partial pressure over the reaction mixture.

---

The present invention relates to a process for separating rhodium from iridium and more particularly to vapometallurgical techniques for separating rhodium from iridium.

Heretofore, the art has endeavored to achieve the separation of rhodium from iridium by various processes which utilize certain special characteristics of solubility. Many of these attempts have been variations of the famous "Nitrite" process whereby the rhodium is purified by hydrometallurgical separations involving neutralization, complexing, filtration, precipitation, digestion and other similar processes. Thus, for example, in the purification of rhodium, the crude rhodium chloride solution is neutralized with sodium carbonate and treated with sodium nitrite to complex the rhodium as the sodium hexanitratorhodate. The base metals are filtered off and rhodium is precipitated in the filtrate by the addition of ammonium chloride. It is then digested with hydrochloric acid and further purified by an ion exchange process. Rhodium black is precipitated upon boiling with formic acid. Earlier processes used multiple sulfide precipitations to separate base metal impurities. These hydrometallurgical separations are generally undesirable for commercial application, however, since they require multiple steps, numerous equipment and a variety of raw materials.

It has now been discovered that improved high efficiency in separating rhodium from iridium can be achieved by selective volatilization of halide-carbon monoxide products through special control of reaction temperature and by employing a water vapor partial pressure over the reaction mixture.

It is an object of the present invention to provide an improved vapometallurgical process for separating rhodium from iridium.

Other objects and advantages will become apparent from the following description.

Generally speaking, the present invention contemplates a process for separating rhodium from iridium by the selective volatilization of a carbonyl halide compound. The specie to be volatilized is or is converted to the hydrated halide salt (chloride, bromide or iodide) and the hydrated halide salt is then reacted with carbon monoxide at a controlled elevated temperature in an atmosphere containing a controlled partial pressure of water vapor. In accordance with the present invention the rhodium and iridium can be in any form or combination such as the elemental metal, oxide, etc. The reaction temperature must be maintained in the range of about 90 to 250° C. to effect an efficient separation. Means must also be provided to recover the volatilized compound from the product gas stream.

It is required that the halide to be carbonylated be in the hydrated form. The anhydrous halides, even with a controlled partial pressure of water vapor maintained in the system, do not significantly react with carbon monoxide to form separable volatile compounds. Depending on the specie to be separated there are many suitable procedures which may be followed to form the hydrated halide, one of which is digestion in a material such as aqua regia. During carbonylation, if the reactant specie becomes dehydrated, it will be necessary to reform the hydrate to insure complete separation. This can be accomplished by addition of water, a corresponding aqueous halide acid, or like material.

The process may be carried out continuously, semicontinuously or batch-wise. In one embodiment, the carbon monoxide, containing a controlled partial pressure of water, is passed through a heated reactor tube containing the hydrated halide metal specie. Suitable means, e.g., intermittent water spray, may be provided to maintain the halide metal in a hydrated condition, although, if the conditions as described herein are followed, this will ordinarily be unnecessary.

It is preferred that carbon monoxide be employed as a continuous flowing gas. Rates will depend upon the design characteristics but, as shown hereinafter, can be varied over a wide range with no significant effect on the separation or the reaction rate. It is also advantageous in maintaining the partial pressure of water in the system to employ a carbon monoxide stream containing a partial pressure of water vapor of about 10 to about 30,000 mm. Hg. The reaction pressure is about atmospheric, although greater or lesser pressures may be employed.

It is advantageous to increase the surface area of the hydrous metal halide species exposed to the contacting gases by suitable means, such as comminution or suspension on an inert medium such as pyrex wool. This markedly increases the reaction rate of the process.

The reaction temperature must be specially controlled to maximize the reaction rate while minimizing dehydration of the hydrated halide and volatilization of contaminants, including residues. The temperature range may be from about 90 to 250° C. but is found to be most advantageous from about 95 to 150° C.

Reaction times will vary depending upon all the above conditions, but have been found to be generally greater than about 2 hours and less than about 6 hours.

To insure recovery of essentially all the volatilized element it is advantageous to scrub the product gas stream using a liquid which will absorb or react with the carbonylated halide. The scrubber can also be used in conjunction with a condenser to achieve a still higher degree of recovery. Another benefit to be derived from the use of a scrubber is elimination of the processing step required to form the final product from the carbonylated halide. Thus, if a suitable scrubbing agent is used, such as aqua regia, a salt or metal will be produced directly.

For the purpose of giving those skilled in the art a better understanding of the invention the following illustrative examples are given:

EXAMPLE I

A series of tests were run on mixtures of $IrCl_3 \cdot 3H_2O$ and $RhCl_3 \cdot 3H_2O$ in a reactor tube 78 centimeters (cms.) long by 3.2 cms. diameter and which has a heated zone of 33 cms. The mixtures were suspended on plugs of pyrex wool and placed in the reactor at about 1 to 2 cms. inside the heated zone. Carbon monoxide, at atmospheric pressure and containing partial pressures of water vapor of about 18 to about 25 mm. Hg, was passed into the reactor at flow rates from 5 to 55 liters per hour (1/hr.). The temperature of the carbon monoxide-water vapor stream was measured in the reactor at the middle of the heated zone and ranged from about 105° C. to about 115° C. Reaction times varied from 2 to 10 hours with the same results. The volatilized rhodium condensate had no detectable amount of iridium and the iridium residue had no detectable amount of rhodium. The analyses are sensitive to about 5 ppm. Details of the test runs are tabulated hereinbelow in Table I.

TABLE I

| Run | $IrCl_3 \cdot 3H_2O$, moles, $\times 10^i$ | $RhCl_3 \cdot 3H_2O$, moles, $\times 10^4$ | Carbon monoxide (1./hr.) | Temp. (° C.) | Reaction time (hrs.) |
|---|---|---|---|---|---|
| 1 | 3.45  | 3.83  | 4.8 | 115 | 10   |
| 2 | 7.21  | 4.79  | 55  | 110 | 2    |
| 3 | 10.08 | 7.0   | 55  | 115 | 7    |
| 4 | 22.43 | 11.16 | 55  | 115 | 2.5  |
| 5 | 5.03  | 2.99  | 55  | 115 | 4.75 |
| 6 | 8.28  | 5.79  | 55  | 115 | 6    |
| 7 | 2.82  | 3.79  | 5.4 | 105 | 2.5  |
| 8 | 2.82  | 3.79  | 5.0 | 110 | 5    |

EXAMPLE II $IrCl_3 \cdot 3H_2O$ and $RhCl_3 \cdot 3H_2O$ were dissolved in anhydrous ethanol in the mole ratio of iridium salt to rhodium salt of 1.68 to 1.00. The alcohol was removed by evaporation under vacuum at ambient temperature to yield an intimate mixture of the two hydrated salts. The mixture was suspended on pyrex wool and the sample placed in the reactor as described in Example I. A gas bottle containing aqua regia was connected to the exit end of the tube to act as a scrubber. Carbon monoxide containing water vapor from about 18–25 mm. Hg and at about 110° C.–120° C. was passed over the sample at 55 l./hr. as described in Example I. The temperature of this stream was measured as described in Example I. After 4.75 hours the condensate at the exit end of the tube was dissolved in aqua regia and this solution combined with the aqua regia in the scrubber. The aqua regia was removed by evaporation on a steam bath. The residue contained about 85% of the rhodium originally present in the mixture and had no detectable amount of iridium species. The analysis is sensitive to about 5 p.p.m.

EXAMPLE III

In an experiment identical to that of Example II, except that the mole ratio of hydrated iridium salt to hydrated rhodium salt was 1.43 to 1.00, about 75% of the rhodium originally present in the mixture was recovered in the residue. As in Example II, no detectable amount of iridium species was found in the residue.

The present invention is particularly applicable to separating rhodium from materials in which rhodium is contaminated with impurities such as iridium.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A process for the separation of rhodium from iridium by selective volatilization of a rhodium carbonyl halide, wherein the halide is selected from the group consisting of chloride, bromide and iodide, which comprises halogenating and hydrating the material to be separated, reacting the resulting hydrated product with carbon monoxide gas in the presence of water vapor having a partial pressure of about 10 to about 30,000 mm. Hg in the system at a temperature of about 90° C. to 250° C. and recovering said rhodium-carbonyl halide product from the gas stream.

2. A process as set forth in claim 1 wherein halogenating and hydrating comprises digesting the material in aqua regia, suspending the material in an inert carrier to increase the surface area exposed to carbon monoxide gas and water vapor and employing means to maintain the material to be separated in a hydrated condition.

3. A process as set forth in claim 1 wherein the carbon monoxide gas and the water vapor are combined in a single gaseous stream.

4. A process as set forth in claim 1 wherein the temperature is maintained in the range of about 95° C. to about 150° C.

5. A process as set forth in claim 1 wherein the product gas stream is scrubbed to recover the volatilized reaction product.

6. A process as set forth in claim 5 wherein the gas stream is scrubbed with aqua regia.

References Cited

FOREIGN PATENTS 250,726    4/1926    Great Britain _____ 423—22

OTHER REFERENCES

Mellor: "A Comprehensive Treatise On Inorganic & Theoretical Chemistry," vol. 15, 1936, pp. 575, 760.

Ephraim: "Inorganic Chemistry," Interscience Publishers, Inc., N.Y., N.Y., 1943, p. 790.

HERBERT T. CARTER, Primary Examiner

U.S. Cl. X.R.

423—417, 462

UNITED STATES PATENT OFFICE
CERTIFICATE OF CORRECTION

Patent No. 3,823,220　　　　　　　Dated July 9, 1974

Inventor(s) Lorraine Guy Donaruma and Lauri Vaska

It is certified that error appears in the above-identified patent and that said Letters Patent are hereby corrected as shown below:

Column 3, Table I, in the heading of the second column of the Table, for "10i" read --- $10^4$ ---.

Column 3, line 29, for "l./hr" read --- 1/hr ---.

Column 4, line 17, for "product from the" read --- from the product

Signed and sealed this 29th day of October 1974.

(SEAL)
Attest:

McCOY M. GIBSON JR.　　　　　　C. MARSHALL DANN
Attesting Officer　　　　　　　　Commissioner of Patents